United States Patent
Klop et al.

(10) Patent No.: US 11,325,521 B2
(45) Date of Patent: May 10, 2022

(54) MULTI-ACCESSORY BRACKET FOR BUMPER MOUNTED ACCESSORIES

(71) Applicant: Ford Global Technologies, LLC, Dearborn, MI (US)

(72) Inventors: Aaron Peter Klop, Bloomfield Hills, MI (US); David Brian Glickman, Southfield, MI (US); Dennis Yee, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 16/549,517

(22) Filed: Aug. 23, 2019

(65) Prior Publication Data

US 2021/0053482 A1 Feb. 25, 2021

(51) Int. Cl.
*B60Q 1/04* (2006.01)
*B60R 19/50* (2006.01)
*B60Q 1/20* (2006.01)
*B62D 35/00* (2006.01)

(52) U.S. Cl.
CPC ............. *B60Q 1/0483* (2013.01); *B60Q 1/20* (2013.01); *B60R 19/50* (2013.01); *B62D 35/005* (2013.01); *B60R 2019/505* (2013.01)

(58) Field of Classification Search
CPC ...... B60Q 1/0483; B60Q 1/20; B62D 35/005; B60R 19/50; B60R 2019/505
See application file for complete search history.

(56) References Cited

U.S. PATENT DOCUMENTS

| | | | | |
|---|---|---|---|---|
| 6,205,638 | B1* | 3/2001 | Yustick | B62D 25/084 |
| | | | | 29/281.5 |
| 2011/0049913 | A1* | 3/2011 | Bernt | B60R 19/48 |
| | | | | 293/102 |
| 2017/0106922 | A1* | 4/2017 | Povinelli | B62D 37/02 |
| 2017/0120967 | A1* | 5/2017 | Yoon | F16H 1/203 |
| 2018/0257594 | A1* | 9/2018 | Du | B60R 19/02 |
| 2018/0297647 | A1* | 10/2018 | Klop | B62D 35/005 |
| 2019/0118872 | A1* | 4/2019 | Shiga | B62D 35/005 |
| 2020/0047827 | A1* | 2/2020 | Solazzo | B62D 37/02 |
| 2020/0094889 | A1* | 3/2020 | Shiga | B62D 35/005 |
| 2020/0164934 | A1* | 5/2020 | Shiga | B62D 35/005 |

FOREIGN PATENT DOCUMENTS

| | | |
|---|---|---|
| CN | 204659643 U | 9/2015 |
| DE | 8127463 U1 | 5/1982 |
| DE | 102004024987 B4 | 8/2008 |
| IN | 2011DE01606 A | 12/2012 |
| JP | 3839282 B2 | 8/2006 |

* cited by examiner

*Primary Examiner* — Jason S Morrow
(74) *Attorney, Agent, or Firm* — Vichit Chea; Carlson, Gaskey & Olds, P.C.

(57) ABSTRACT

An apparatus, according to an exemplary embodiment includes, among other things, a single-piece bracket having a first mount interface configured to receive a fog lamp and a second mount interface configured to receive an actuator for an active air dam. A method according to an exemplary aspect of the present disclosure includes, among other things, injection molding a single-piece bracket from a plastic material to include a first mount interface configured to receive a fog lamp and a second mount interface configured to receive an actuator for an active air dam.

20 Claims, 2 Drawing Sheets

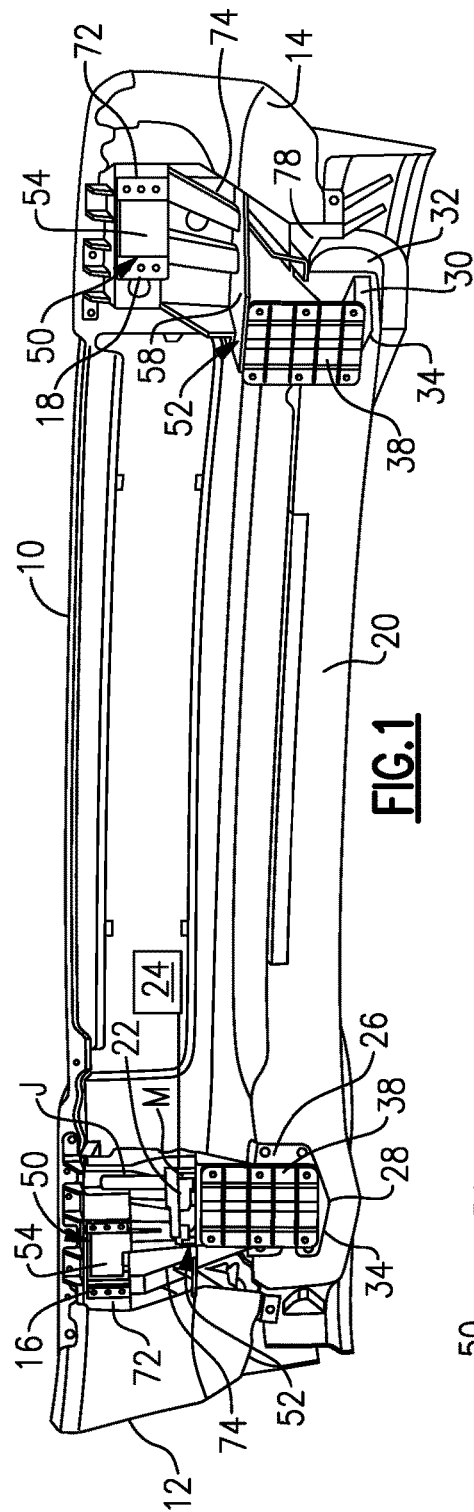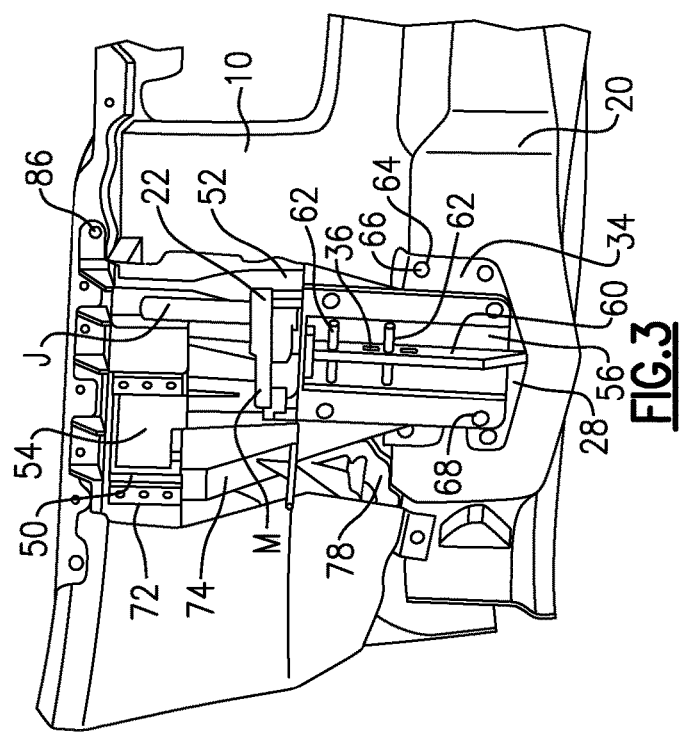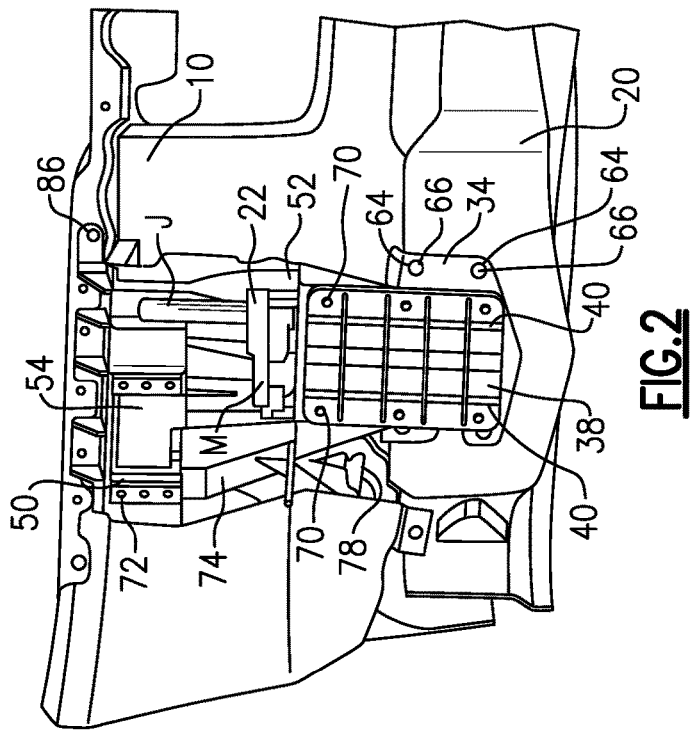

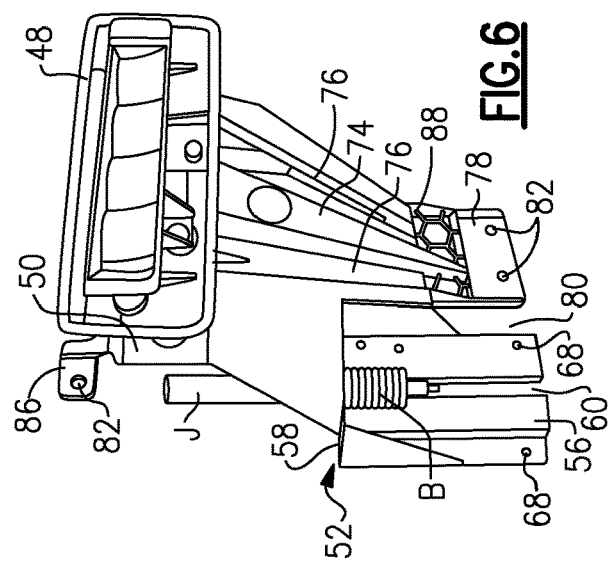
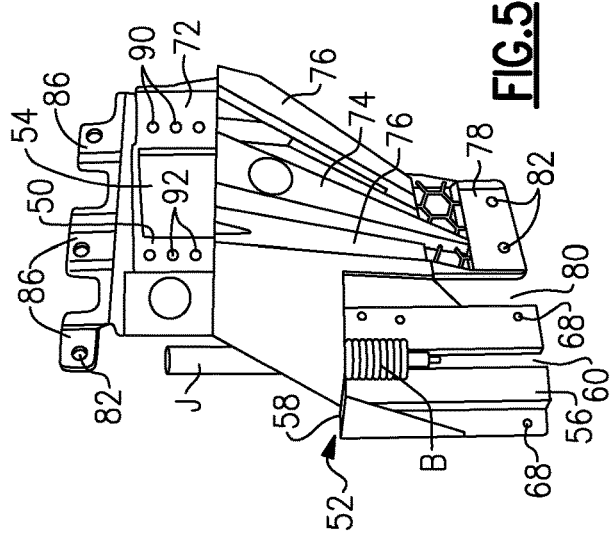
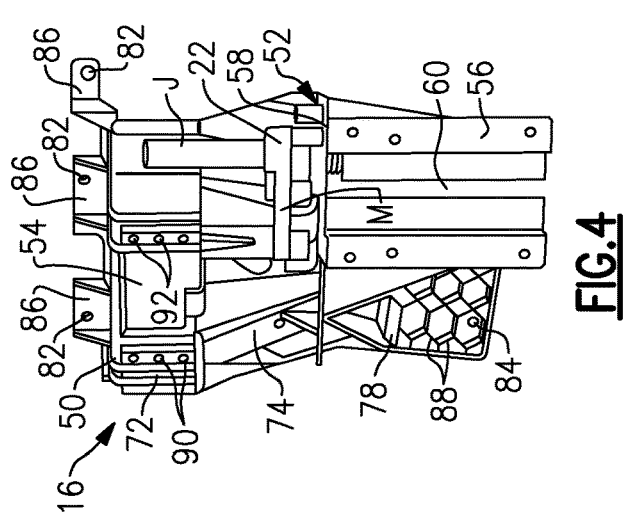
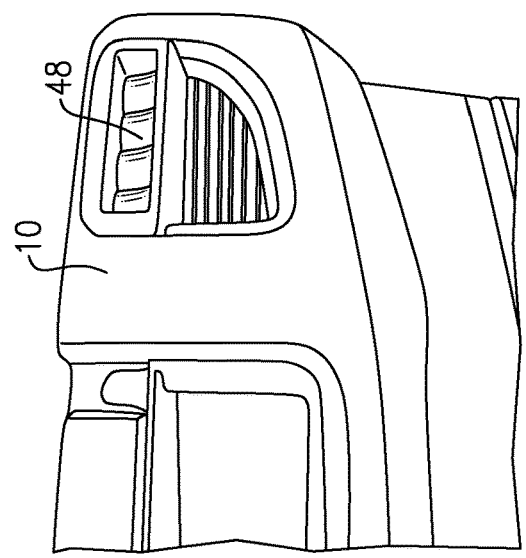

MULTI-ACCESSORY BRACKET FOR BUMPER MOUNTED ACCESSORIES

TECHNICAL FIELD

This disclosure relates generally to a multi-accessory bracket for bumper mounted accessories.

BACKGROUND

Vehicles can include different types of accessories such as fog lamps and air dams, for example. These accessories are attached to a bumper using multiple brackets. The use of multiple brackets makes assembly more time consuming as well as increasing cost and weight.

SUMMARY

An apparatus according to an exemplary aspect of the present disclosure includes, among other things, a single-piece bracket having a first mount interface configured to receive a fog lamp and a second mount interface configured to receive an actuator for an active air dam.

In a further non-limiting embodiment of the foregoing apparatus, the second mount interface comprises a horizontal platform providing a flat surface for the actuator and a vertical wall that supports a trolley that moves with the active air dam.

In a further non-limiting embodiment of any of the foregoing apparatus, the vertical wall includes a slot that receives a portion of the trolley.

In a further non-limiting embodiment of any of the foregoing apparatus, the actuator comprises a screw jack.

In a further non-limiting embodiment of any of the foregoing apparatus, the first mount interface comprises an opening to receive a rear portion of the fog lamp and a plurality of fastener openings located adjacent to the opening.

In a further non-limiting embodiment of any of the foregoing apparatus, the vertical wall for the trolley comprises a first vertical wall portion and wherein the opening for the first mount interface is formed in a second vertical wall portion that is connected to the horizontal platform via a third wall portion.

In a further non-limiting embodiment of any of the foregoing apparatus, the third wall portion extends at an obtuse angle relative to the horizontal platform and at an obtuse angle relative to the second vertical wall portion.

In a further non-limiting embodiment of any of the foregoing apparatus, at least one reinforcement strut is formed as part of the third wall portion.

In a further non-limiting embodiment of any of the foregoing apparatus, a third vertical wall portion is spaced from the first vertical wall portion by a slot, and wherein the third vertical wall portion includes at least one bumper fastener opening, and wherein the third vertical wall portion includes a plurality of reinforcing ribs.

An apparatus, according to yet another exemplary aspect of the present disclosure includes, among other things, a bumper extending between a first bumper end portion and a second bumper end portion, a first single-piece bracket mounted to the first bumper end portion, and a second single-piece bracket mounted to the second bumper end portion. An air dam extends along the bumper from the first bumper end portion to the second bumper end portion, wherein the air dam is moveable between a deployed position and a retracted position relative to the bumper. An actuator is configured to control movement of the air dam between the deployed and retracted positions, and wherein at least one of the first and second single-piece brackets has a first mount interface that mounts a fog lamp and a second mount interface that mounts the actuator.

In a further non-limiting embodiment of any of the foregoing apparatus, the second mount interface comprises a horizontal platform providing a flat surface for the actuator and a vertical wall that supports a first trolley that moves with the air dam.

In a further non-limiting embodiment of any of the foregoing apparatus, the other of the first and second single-piece brackets includes a vertical wall portion that supports a second trolley that moves with the air dam, and wherein the actuator comprises a screw jack that extends and causes the first and second trolleys to move the air dam to the deployed position.

In a further non-limiting embodiment of any of the foregoing apparatus, the fog lamp comprises a first fog lamp and including a second fog lamp mounted to the other of the first and second single-piece brackets such that the air dam connects the first and second fog lamps via the first and second single-piece brackets.

In a further non-limiting embodiment of any of the foregoing apparatus, the vertical wall includes a slot that receives a portion of the trolley.

In a further non-limiting embodiment of any of the foregoing apparatus, the first mount interface includes an opening to receive a rear portion of the fog lamp.

In a further non-limiting embodiment of any of the foregoing apparatus, the vertical wall for the trolley comprises a first vertical wall portion and wherein the opening for the first mount interface is formed in a second vertical wall portion that is connected to the horizontal platform via a third wall portion.

In a further non-limiting embodiment of any of the foregoing apparatus, the third wall portion extends at an obtuse angle relative to the horizontal platform and at an obtuse angle relative to the second vertical wall portion.

In a further non-limiting embodiment of any of the foregoing apparatus, at least one reinforcement strut is formed as part of the third wall portion, and a third vertical wall portion is spaced from the first vertical wall portion by a slot, and wherein the third vertical wall portion includes at least one bumper fastener opening, and wherein the third vertical wall portion includes a plurality of reinforcing ribs.

In a further non-limiting embodiment of any of the foregoing apparatus, the bumper comprises an exposed steel bumper.

A method according to still another exemplary aspect of the present disclosure includes, among other things, injection molding a single-piece bracket from a plastic material to include a first mount interface configured to receive a fog lamp and a second mount interface configured to receive an actuator for an active air dam.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 is a perspective rear view of first and second single-piece brackets mounted to a bumper.

FIG. 2 is an enlarged view of a single piece-bracket from FIG. 1 to which both an active air dam actuator and a fog lamp are to be mounted.

FIG. 3 is a view similar to FIG. 2 but with a trolley cover from the active air dam actuator being removed.

FIG. 4 is a rear perspective view of the single-piece bracket of FIG. 2.

FIG. 5 is a front perspective view of the single-piece bracket of FIG. 4.

FIG. 6 is a view similar to FIG. 5 but showing a fog lamp installed.

FIG. 7 is a front perspective view of a bumper with a fog lamp installed with the single-piece bracket of FIG. 6.

DETAILED DESCRIPTION

This disclosure details an exemplary a multi-accessory bracket for bumper mounted accessories. With reference to FIG. 1, a bumper 10 is shown as extending between a first bumper end portion 12 and a second bumper end portion 14. In one example, the bumper 10 comprises an exposed steel bumper that is used on a truck. In one example, the exposed steel bumper is a stamped high strength steel chrome and painted exterior bumper beam. A first single-piece bracket 16 is mounted to the first bumper end portion 12 and a second single-piece bracket 18 is mounted to the second bumper end portion 14.

An air dam 20 from an active air dam system extends along the bumper 10 from the first bumper end portion 12 to the second bumper end portion 14. The air dam 20 is moveable between a deployed position and a retracted position relative to the bumper 10. The air dam 20 is used to improve fuel economy and allows for maximum approach angle and improved appearance and obstacle avoidance at low speeds in the retracted position, e.g., avoidance of railroad tie barriers or high curbs in a parking lot, and is in the deployed position at high speed for maximum fuel economy performance. The active air dam system uses an actuator 22, such as a screw drive motor M with a screw jack J, for example, for robustness and fast actuation response. The actuator 22 is in communication with a system controller 24 (FIG. 1) to control movement of the air dam 20 between the deployed and retracted positions. At high speeds, the controller 24 activates the actuator 22 to move the air dam 20 to extend downwardly relative to the bumper 10 to the deployed position. At low speeds, the controller 24 actuates the actuator 22 to retract the air dam 20 upwardly relative to the bumper 10.

The active air dam system includes a first trolley 26 that is coupled to a first end 28 of the air dam 20 and a second trolley 30 that is coupled to a second end 32 of the air dam 20. The trolleys 26, 30 each include a flange portion 34 that mounts directly to the air dam 20 and a leg portion 36 (FIG. 3) that is coupled for movement with the actuator 22. The actuator 22, e.g. the screw jack, is mounted to one of the first 16 and second 18 single-piece brackets along with the first trolley 26. When the actuator 22 moves the first trolley 26, the second trolley 30 is also caused to move via the connection to the air dam 20. Trolley covers 38 are mounted to the first 16 and second 18 single-piece brackets to cover and protect the leg portions 36 from debris and other contaminants as shown in FIG. 1. In one example, the trolley covers 38 comprise generally flat, solid plates that may include strengthening ribs 40 (FIG. 2) as needed to increase stiffness. Also, a boot B (FIGS. 5-6) can be used to protect the screw jack J from dirt and debris.

As best shown in FIGS. 4-6, the first single-piece bracket 16 has a first mount interface 50 that mounts a fog lamp 48 (FIG. 6) and a second mount interface 52 that mounts the actuator 22. In one example, the first mount interface 50 includes an opening 54 to receive a rear portion of the fog lamp 48. In one example, the second mount interface 52 comprises a horizontal platform 58 providing a flat surface for the actuator 22 and a first vertical wall 56 that supports the first trolley 26 that moves with the air dam 20.

The second single-piece bracket 18 includes the first mount interface 50 that mounts a second fog lamp 48 to the second bumper end portion 14. The second single-piece bracket 18 also includes the second mount interface 52 that mounts the second trolley 30 that is coupled to the actuator 22 via the air dam 20. As discussed above, the first mount interface 50 includes an opening 54 to receive a rear portion of the fog lamp 48, and the second mount interface 52 includes the horizontal platform 58 and the first vertical wall 56 that supports the second trolley 30 that moves with the air dam 20. The bumper 10 thus includes the first fog lamp 48 mounted to the first bumper end portion 12 via the first single-piece bracket 16 and the second fog lamp 48 mounted to the second bumper end portion 14 via the second single-piece bracket 18. As such, the air dam 20 connects the first and second fog lamps 48 to each other via the first 16 and second 18 single-piece brackets. This helps to stiffen the air dam system by reducing system twist.

In one example, each first vertical wall 56 includes a slot 60 that receives the leg portion 36 of the respective first 26 and second 30 trolleys. One or more transverse bars 62 (FIG. 3) are used to retain the leg portion 36 in the slot 60 while still allowing the leg portion 36 to move back and forth in the vertical direction. The flange portion 34 of the trolleys 26, 30 includes one or more openings 64 (FIG. 2) that receive fasteners 66 to secure the trolleys 26, 30 to the air dam 20. The first vertical wall 56 includes one or more openings 68 (FIG. 5) to receive fasteners 70 (FIG. 2) to secure the trolley covers 38 to the single-piece brackets 16, 18.

In one example, the openings 54 for the first mount interface 50 of each single-piece bracket 16, 18 are formed in a second vertical wall portion 72 that is connected to the horizontal platform 58 via a third wall portion 74. In one example, the third wall portion 74 extends at an obtuse angle relative to the horizontal platform 58 and at an obtuse angle relative to the second vertical wall portion 72. Thus, the third wall portion 74 comprises a generally solid portion that extends at an angle to connect the two vertical wall portions together. In one example, there is at least one reinforcement strut 76 (FIG. 6) formed as part of the third wall portion 74. A third vertical wall portion 78 is spaced from the first vertical wall portion 56 by a slot or gap 80. The third vertical wall portion 78 includes one or more bumper fastener openings 82 (FIG. 6) that receive fasteners 84 (FIG. 4) to secure the brackets to the bumper 10. Additional flanges 86 include additional bumper fastener openings 82 that receive fasteners 84. In one example, the third vertical wall portion 78 includes a plurality of reinforcing ribs 88.

As shown in FIGS. 4-5, the first mounting interface 50 includes one or more openings 90 that are positioned adjacent to the opening 54 for the fog lamp 48. These openings 90 receive fasteners 92 to secure the fog lamp 48 to the bracket 16, 18. In one example, the openings 90 are positioned only on lateral edges of the opening 54 and are not located above or below the opening 54.

Exposed steel bumpers are typically utilized on trucks, and as bumper content becomes greater there are packaging and performance challenges. For example, fog lamp sizes have increased over the years and the lamps have been moved to a more outboard location, resulting in the requirement of large brackets to mount them to the bumper. This results in the fog lamps being mounted to the wing ends of bumpers, which makes them less stable and highly sensitive to mass and sectional properties. Thus, the brackets tend to be massive and heavy, and often need further reinforcement to counter their own weight. Further, the incorporation of an active air dam system into the bumper introduces additional brackets and actuating structures that even further increase weight.

The disclosed single-piece bracket 16, 18 comprises a rigid mounting bracket with a complex shape that includes mounting hard points for both the fog lamp 48 and the active air dam actuator 22. In one example, the bracket 16, 18 bolts to a stamped high strength steel chrome and painted exterior bumper beam. The bracket is configured to accommodate high acceleration forces that are required for trucks, e.g. in access of 23 times gravity, can accommodate a highly corrosive environment, and does not create a galvanic cell with mating metallic surfaces. Further, the bracket meets lighting optic dimensions and provides access for fog lamp adjustment hardware and integrated harness attachment features.

In one example, the bracket comprises a one-piece injection molded plastic part that includes the integrated mounting hard points/attachment features for the fog lamps 48 and active air dam actuator 22. The bracket has clearance holes for mechanical fasteners and structural ribbing around send clearance holes that do not require metal compression limiters. The bracket includes molded in mechanical self tapping fastener/screw bosses that eliminate the need for spring steel u-nuts or j-clips. When combined with the stamped bumper beam, the brackets create a box section for improved noise, vibration, harshness (NVH) performance of the bumper assembly by increasing the natural frequency of the structure.

Additionally, the bracket allows the trolley system to improve the stability and travel of the air dam, which has only seconds to retract under certain defined conditions like low-speed, off-road, etc. The trolley system ensures true travel under load more efficiently than just by a screw jack alone, and is more robust because the moving parts are isolated from main panels of the system. The trolley system supports the mass and friction of the system, so the actuator torque at high speed is smaller than prior configurations, improving cost and durability of the system. Further, at low speeds, e.g. less than 40 mph, when bumper displacement is at maximum, the air dam can also help stiffen the system as the air dam connects the two fog lamps to help reduce system twist. Thus, the subject bracket and active air dam system is more robust and is packaging efficient compared to prior configurations. The subject bracket also allows for the elimination of parts, reduces weight and cost of the bumper assembly, and eases manufacturing.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
a single-piece bracket having a first mount interface comprising a fog lamp mount configured to receive a fog lamp and a second mount interface comprising an actuator mount configured to receive an actuator for an active air dam, wherein the fog lamp mount includes an opening formed within a first wall portion of the single-piece bracket, the opening receiving the fog lamp, and wherein the actuator mount comprises a second wall portion of the single-piece bracket, the second wall portion receiving a movable member driven by the actuator.

2. An apparatus, comprising:
a single-piece bracket having a first mount interface comprising a fog lamp mount configured to receive a fog lamp and a second mount interface comprising an actuator mount configured to receive an actuator for an active air dam, wherein the second mount interface comprises a horizontal platform providing a flat surface for the actuator and a vertical wall that supports a trolley that moves with the active air dam.

3. The apparatus according to claim 2, wherein the vertical wall includes a slot that receives a portion of the trolley.

4. The apparatus according to claim 2, wherein the actuator comprises a screw jack.

5. The apparatus according to claim 2, wherein the first mount interface comprises an opening to receive a rear portion of the fog lamp and a plurality of fastener openings located adjacent to the opening.

6. The apparatus according to claim 5, wherein the vertical wall for the trolley comprises a first vertical wall portion and wherein the opening for the first mount interface is formed in a second vertical wall portion that is connected to the horizontal platform via a third wall portion.

7. The apparatus according to claim 6, wherein the third wall portion extends at an obtuse angle relative to the horizontal platform and at an obtuse angle relative to the second vertical wall portion.

8. The apparatus according to claim 7, including at least one reinforcement strut formed as part of the third wall portion.

9. The apparatus according to claim 8, including a third vertical wall portion spaced from the first vertical wall portion by a slot, wherein the third vertical wall portion includes at least one bumper fastener opening, and wherein the third vertical wall portion includes a plurality of reinforcing ribs.

10. An apparatus, comprising:
a bumper extending between a first bumper end portion and a second bumper end portion;
a first single-piece bracket mounted to the first bumper end portion and a second single-piece bracket mounted to the second bumper end portion;
an air dam extending along the bumper from the first bumper end portion to the second bumper end portion, wherein the air dam is moveable between a deployed position and a retracted position relative to the bumper;

an actuator configured to control movement of the air dam between the deployed and retracted positions; and wherein at least one of the first and second single-piece brackets has a first mount interface that mounts a fog lamp and a second mount interface that mounts the actuator, wherein the first mount interface includes an opening formed within a first wall portion of the at least one of the first and second single-piece brackets, the opening receiving the fog lamp, and wherein the second mount interface comprises a second wall portion of the at least one of the first and second single-piece brackets, the second wall portion receiving a movable member driven by the actuator.

11. The apparatus according to claim 10, wherein the second mount interface comprises a horizontal platform providing a flat surface for the actuator and wherein the second wall portion comprises a vertical wall that supports a first trolley that moves with the air dam.

12. The apparatus according to claim 11, wherein the other of the first and second single-piece brackets includes another vertical wall portion that supports a second trolley that moves with the air dam, and wherein the actuator comprises a screw jack that extends and causes the first and second trolleys to move the air dam to the deployed position.

13. The apparatus according to claim 11, wherein the fog lamp comprises a first fog lamp and including a second fog lamp mounted to the other of the first and second single-piece brackets such that the air dam connects the first and second fog lamps via the first and second single-piece brackets.

14. The apparatus according to claim 11, wherein the vertical wall includes a slot that receives a portion of the trolley.

15. The apparatus according to claim 11, wherein the opening in the first wall portion receives a rear portion of the fog lamp.

16. The apparatus according to claim 15, wherein the first wall portion for the fog lamp comprises a first vertical wall portion and wherein the vertical wall for the trolley comprises a second vertical wall portion that is connected to the horizontal platform via a third wall portion.

17. The apparatus according to claim 16, wherein the third wall portion extends at an obtuse angle relative to the horizontal platform and at an obtuse angle relative to the first vertical wall portion.

18. The apparatus according to claim 17, including at least one reinforcement strut formed as part of the third wall portion, and including a third vertical wall portion spaced from the second vertical wall portion by a slot, wherein the third vertical wall portion includes at least one bumper fastener opening, and wherein the third vertical wall portion includes a plurality of reinforcing ribs.

19. The apparatus according to claim 10 wherein the bumper comprises an exposed steel bumper.

20. A method comprising:

injection molding a single-piece bracket from a plastic material to include a first mount interface comprising a fog lamp mount configured to receive a fog lamp and a second mount interface comprising an actuator mount configured to receive an actuator for an active air dam wherein the actuator mount comprises a first wall portion of the single-piece bracket and the fog lamp mount includes an opening formed within a second wall portion of the single-piece bracket to receive the fog lamp.

* * * * *